(12) United States Patent
Hobbs

(10) Patent No.: US 8,928,324 B2
(45) Date of Patent: Jan. 6, 2015

(54) IN-LINE AND BROADSIDE MARINE ELECTROMAGNETIC SURVEYING

(75) Inventor: Bruce Alan Hobbs, Penicuik (GB)

(73) Assignee: PGS Geophysical AS, Oslo (NO)

( * ) Notice: Subject to any disclaimer, the term of this patent is extended or adjusted under 35 U.S.C. 154(b) by 501 days.

(21) Appl. No.: 13/337,696

(22) Filed: Dec. 27, 2011

(65) Prior Publication Data

US 2013/0162256 A1 Jun. 27, 2013

(51) Int. Cl.
*G01V 3/08* (2006.01)

(52) U.S. Cl.
CPC ..................................... *G01V 3/083* (2013.01)
USPC .......................................................... 324/334

(58) Field of Classification Search
None
See application file for complete search history.

(56) References Cited

U.S. PATENT DOCUMENTS

| | | | |
|---|---|---|---|
| 4,617,518 A | 10/1986 | Srnka | |
| 7,191,063 B2 | 3/2007 | Tompkins | |
| 7,446,535 B1 | 11/2008 | Tenghamn et al. | |
| 7,602,191 B2 | 10/2009 | Davidsson | |
| 7,671,598 B2 | 3/2010 | Ronaess et al. | |
| 7,834,632 B2 | 11/2010 | Tenghamn et al. | |
| 8,035,393 B2 | 10/2011 | Tenghamn et al. | |
| 8,115,491 B2 | 2/2012 | Alumbaugh et al. | |
| 8,570,044 B2 * | 10/2013 | Tompkins et al. | 324/338 |
| 2010/0017133 A1 | 1/2010 | Ziolkowski et al. | |
| 2010/0045296 A1 | 2/2010 | Tenghamn | |
| 2010/0109671 A1 | 5/2010 | Hobbs | |
| 2010/0238762 A1 | 9/2010 | Hornbostel | |
| 2011/0037473 A1 | 2/2011 | He et al. | |
| 2011/0255368 A1 | 10/2011 | Sudow et al. | |
| 2011/0260730 A1 | 10/2011 | Sudow et al. | |
| 2011/0273179 A1 | 11/2011 | Sudow | |
| 2013/0162255 A1 | 6/2013 | Sudow et al. | |

FOREIGN PATENT DOCUMENTS

| | | |
|---|---|---|
| GB | 2155182 A | 9/1985 |
| GB | 2402745 A | 12/2004 |
| GB | 2458959 A | 10/2009 |
| GB | 2460790 A | 12/2009 |
| GB | 2467108 A | 7/2010 |
| GB | 2480149 A | 9/2011 |

OTHER PUBLICATIONS

Powell, Greg, Patent Examination Report No. 1, Oct. 23, 2013, IP Australia, Australian Government, Australia.
Johan Mattsson, et al., "Error Analysis and Capability Modelling for Towed Streamer Electromagnetics," First Break, Aug. 2012, pp. 91-96, vol. 30.

(Continued)

*Primary Examiner* — Paresh Patel

(57) ABSTRACT

Methods for geophysical surveying include disposing an electromagnetic source and first and second receiver electrodes in water; actuating the source; and detecting a responsive electromagnetic field by measuring a potential difference between the first and second receiver electrodes, wherein: the electromagnetic source defines a source dipole axis; the first and second receiver electrodes define a receiver dipole axis; and the source dipole axis is not substantially parallel to the receiver dipole axis. Systems for geophysical surveying include a first source electrode on a first source cable; a second source electrode on a different second source cable, the first and second source electrodes forming an electromagnetic source and defining a source dipole axis; a first receiver electrode on a first receiver cable; a second receiver electrode on a different second receiver cable, the first and second receiver electrodes defining a receiver dipole axis not substantially parallel to the source dipole axis.

15 Claims, 3 Drawing Sheets

(56) References Cited

OTHER PUBLICATIONS

Johan Mattsson, et al., "Toward Streamer EM: The Challenges of Sensitivity and Anisotropy" First Break, Jun. 2013, pp. 155-159, vol. 31.

Chris Anderson, et al., "An Integrated Approach to Marine Electromagnetic Surveying Using A Towed Streamer and Source" First Break, May 2010, pp. 71-75, vol. 28.

Steven Constable and Chester J. Weiss, Mapping Thin Resistors and Hydrocarbons with Marine EM Methods: Insights from 1D Modeling, Geophysics, vol. 71, No. 2 (Mar.-Apr. 2006), pp. G43-G51, Society of Exploration Geophysicists, USA.

Gregory A. Newman, Michael Commer, and James J Carazzone, Imaging CSEM Data in the Presence of Electrical Anisotropy, Geophysics, vol. 75, No. 2 (Mar.-Apr. 2010), pp. F51-F61, Society of Exploration Geophysicists, USA.

United Kingdom Search Report for Application No. GB1222817.7, dated: Mar. 22, 2013.

\* cited by examiner

IN-LINE AND BROADSIDE MARINE ELECTROMAGNETIC SURVEYING

CROSS-REFERENCE TO RELATED APPLICATIONS

This application is related to co-pending and commonly assigned application Ser. No. 13/337,456 titled "Electromagnetic Geophysical Survey Systems and Methods Employing Electric Potential Mapping", which application is incorporated by reference herein as if reproduced in full below.

STATEMENT REGARDING FEDERALLY SPONSORED RESEARCH OR DEVELOPMENT

Not applicable.

BACKGROUND

This invention relates generally to the field of marine electromagnetic surveying, and, at least in some embodiments, to novel configurations of electromagnetic sources and receivers which may provide opportunities to more efficiently capture, process, and interpret geophysical data.

Marine electromagnetic surveying may be used to identify hydrocarbon reserves in formations below the bottom of a body of water, such as a lake or ocean. In a typical marine electromagnetic survey, an electromagnetic ("EM") source and a number of EM receivers are located in a body of water. The EM source may be towed by a survey vessel over a formation of interest, and the receivers may be disposed over the formation, often at or near the bottom of the body of water, to obtain signals related to the distribution of EM resistivity in the formation. The receivers may also be towed by the same or other survey vessel. Such surveying is typically performed for a range of EM source and EM receiver positions. The EM source may emit either or both a time varying electric field and a time varying magnetic field, which may propagate outwardly into the overlying water and downwardly into the formation below the water. The time varying EM field may be induced by passing electric current through an antenna. The electric current may be continuous wave and have one or more discrete frequencies. It is also known in the art to apply direct current to an antenna, and produce transient EM fields by switching the current. Such switching may include, for example, switching on, switching off, inverting polarity and inverting polarity after a switch on or switch off event. Such switching may be equally or unequally time spaced, in a time series known as a pseudo random binary sequence ("PRBS"), or in some other selected sequence.

EM energy may be rapidly attenuated in seawater, but less conductive subsurface formations attenuate EM energy less, allowing it to propagate more efficiently. Additionally, hydrocarbon-containing subsurface reservoirs tend to be more resistive than permeable formations with aqueous saline fluids. If the frequency of the EM energy is low enough, it can propagate deep into subsurface formations. Energy may be reflected from subsurface layers back to the water bottom. When the source-receiver spacing ("offset") is comparable-to or greater-than the formation depth of the subsurface layer (the depth below the water bottom), the reflected energy will dominate over the transmitted energy. Marine electromagnetic surveying uses the large resistivity contrast between hydrocarbon-containing subsurface reservoirs and permeable formations with aqueous saline fluids to assist in identifying the geophysical properties of the formation.

Marine electromagnetic surveying typically requires a minimum of four electrodes: two source electrodes through which a current is passed, and two receiver electrodes between which a voltage is measured. There are two basic configurations: (a) in-line, whereby the four electrodes are co-linear, and (b) broadside, whereby the source dipole is parallel to the receiver dipole, and the four electrodes create a rectangle. A continuous range of configurations is possible between these extremes, since, for any source dipole, measurements could be made between any two other electrodes placed in any position.

Often, the broadside EM field components are omitted in marine electromagnetic surveying data analysis as the main part of the information of the subsurface structure can be found in the in-line electromagnetic field component. However, the inability to measure broadside EM field components reduces the uniqueness of the processed result, which is a drawback from a data analysis perspective.

Some current techniques for obtaining both in-line and broadside measurements require that the source first be towed along a line of receivers, and then be towed on a parallel course at a given offset to obtain in-line and broadside data for a single offset. Others require additional equipment, such as a reference potential line, additional receiver electrodes, broadside towing equipment, broadside electrical connections, etc., which adds complexity and cost to the system. Some current techniques anchor the EM receivers to the water bottom, requiring complex deployment and positioning systems, and making surveying of larger areas with dense receiver spacing impractical.

BRIEF DESCRIPTION OF THE DRAWINGS

These drawings illustrate certain aspects of some of the embodiments of the present invention, and should not be used to limit or define the invention.

DETAILED DESCRIPTION

This invention relates generally to the field of marine electromagnetic surveying, and, at least in some embodiments, to novel configurations of electromagnetic sources and receivers which may provide opportunities to more efficiently capture, process, and interpret geophysical data.

If there is any conflict in the usages of a word or term in this specification and one or more patent or other documents that may be incorporated herein by reference, the definitions that are consistent with this specification should be adopted for the purposes of understanding this invention.

Systems and methods according to some embodiments of the invention may provide both in-line and broadside data for a range of offsets (distance between a source and a receiver)

with only a single towing pass. The electromagnetic responses thus obtained might lead to superior data processing and survey interpretation. Collection of in-line and broadside data may lead to new methods of data analysis and interpretation, especially applicable to anisotropy and multi-dimensional effects.

Measuring both in-line and broadside electromagnetic fields may allow for discrimination between thin resistive anomalies in the formation and generally thicker subsurface resistors. Also, since different inductive modes may be measured in the two cases, measurement of both would aid the determination of anisotropy and the separation of transverse electric and transverse magnetic modes. An in-line configuration can be embedded in a single receiver cable and towed along with the source. With suitable modifications, the broadside mode could also be towed. A single ship can tow multiple receiver cables, and in particular can tow two parallel cables. This enables both in-line and broadside configurations to be towed and operated simultaneously, as in the invention described below.

Figure 1:
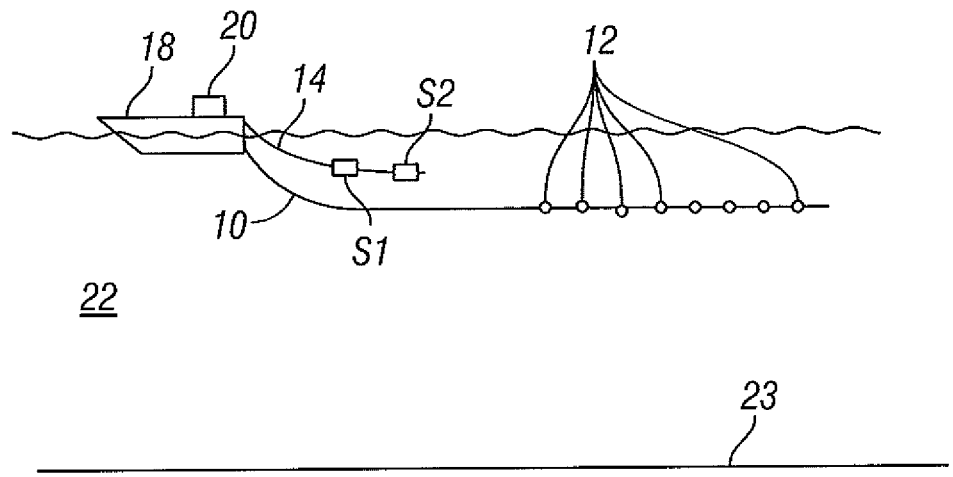
FIG. 1 illustrates a possible towing configuration wherein a ship tows source electrodes and receivers.

An example marine electromagnetic survey system is shown schematically in FIG. 1. The marine electromagnetic survey system may include a receiver cable 10 having thereon at longitudinally spaced apart positions a plurality of receivers 12. (Eight receivers are illustrated in FIG. 1, but any number of receivers may be utilized as most appropriate for the given operational conditions.) The receiver cable 10 is shown being towed by a survey vessel 18 moving on the surface of a body of water 22 such as a lake or ocean. The survey vessel 18 may also tow a source cable 14. The receiver cable 10 may alternatively be deployed on the water bottom 23 or towed by another vessel (not shown). As another alternative, one or more additional receiver cables may be deployed behind the survey vessel 18, behind another vessel (not shown), or on the water bottom 23. The invention may also be used with receiver nodes (not shown), e.g., static nodes disposed on the water bottom 23. The receivers 12 may be used to measure the electromagnetic response of formations below the water bottom 23 to electromagnetic field(s) imparted by the electromagnetic source on source cable 14. The receivers may measure one or more various electromagnetic field properties, such as voltage, magnetic field amplitude, and/or magnetic field gradient.

The survey vessel 18 may include thereon equipment, shown generally at 20 and referred to for convenience as a "recording system" that may include devices (none shown separately) for navigation, for energizing electromagnetic sources for imparting an electromagnetic field in the formations below the water bottom 23, and/or for recording and processing signals generated by the various receivers 12. In some embodiments, components of the recording system 20 may be located at or near the water bottom 23, for example, to collect, store, record, process, and/or transmit data from the receivers 12.

Receiver cable 10 and source cable 14 may comprise cables commonly used in marine electromagnetic surveying. Each receiver cable 10 and source cable 14 may include a strength member to transfer axial loading along the length of the cable. Additionally, each receiver cable 10 and source cable 14 may include electrical wires and/or optical fibers to communicate electrical signals, optical signals, and electrical power along the length of the cable. It should be understood that transmitting signals along optical fibers, rather than electrical wires, will result in reduced EM noise in the survey data. Likewise, batteries may be located at various positions along the length of receiver cable 10 to power circuits and devices on the cable. This would minimize the amount of electrical power transmitted along the length of the receiver cable 10, thereby reducing EM noise in the survey data.

Each receiver 12 may comprise a pair of electrodes. Voltage measuring devices may be associated with the electrode pairs of each receiver 12. In some embodiments, certain voltage measuring devices may be switchably associated with more than one pair of electrodes, and likewise with more than one receiver 12. For example, switchable association of voltage measuring devices with receiver electrodes is discussed in commonly-owned U.S. patent application Ser. No. 12/799,528, which is herein incorporated by reference. Such voltage measuring devices may obtain voltage measurements across pairs of electrodes in response to a detected electric field amplitude. Such voltage measurements may be stored, transmitted to the recording system 20 for storage, processing, or interpretation, or transmitted to a different location for storage, processing, or interpretation.

Figure 2:
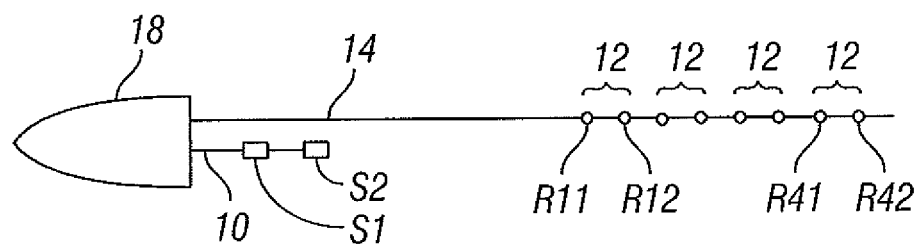
FIG. 2 illustrates another possible towing configuration showing a plan view of a single receiver cable.

The source on source cable 14 may comprise a pair of electrodes S1, S2. As shown in FIG. 2, source electrodes S1, S2 may be disposed in an "in-line" configuration, meaning that the axis between the source electrodes S1, S2 is substantially parallel to the axis between receiver electrode pairs, for example R11, R12. In particular, FIG. 2 illustrates an in-line configuration where the source and receivers 12 are co-linear. An alternative co-linear, in-line configuration may be achieved by including both source electrodes S1, S2 and receivers 12 on a single source/receiver cable.

Figure 3:
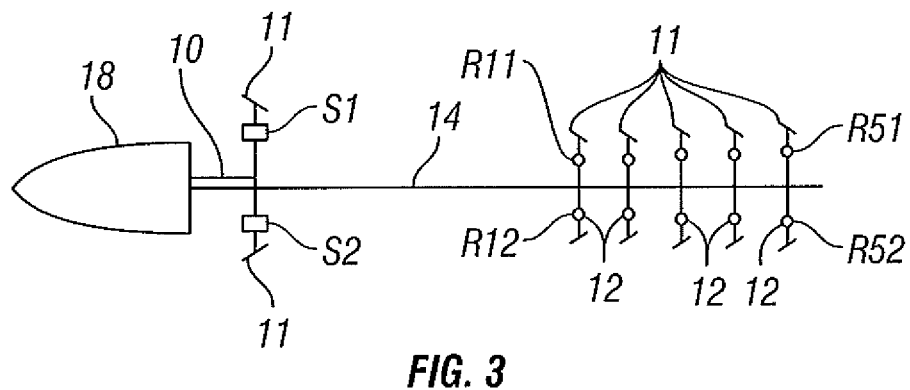
FIG. 3 illustrates another possible towing configuration showing a plan view of a towed broadside source and single broadside receiver cable with doors to separate electrodes perpendicular to the towing direction.

FIG. 3 illustrates both the source electrodes S1, S2 and the receiver electrodes R11, R12 being towed in a broadside configuration. Towing broadside configurations may require suitable modifications, such as the use of doors 11 (also known as paravanes or deflectors) to keep the electrodes separated. The doors 11 and the cables connecting the electrodes, disposed perpendicular to the direction of the vessel may induce drag and result in electrode motion perpendicular to the vessel direction, thereby creating a potentially large EM noise source.

As would be understood by one of ordinary skill in the art with the benefit of this disclosure, the electromagnetic field response at receiver 12 measured with an in-line configuration (as illustrated in FIG. 2, for example) may be predominantly sensitive to vertical current flow. This current flow may respond primarily to a change from conductive to resistive material with depth, so it may be used to sense the top of a resistive hydrocarbon reservoir. At the base of the reservoir, the change may be primarily from a resistive to a conductive material with depth, to which the vertical current flow may be relatively insensitive. The vertical current flow may be determined principally by the vertical component of resistivity.

As would also be understood by one of ordinary skill in the art with the benefit of this disclosure, the electromagnetic field response at receiver 12 measured with a broadside configuration (as illustrated in FIG. 3, for example) may predominantly sense horizontal current flow. The associated responses may sense changes from resistive to conductive material with depth. The horizontal current flow may be determined principally by the horizontal component of resistivity.

Use of both in-line and broadside measurements may be superior to the use of only in-line measurements. Measuring both may allow for discrimination between thin resistive anomalies and generally thicker subsurface resistors. It is believed that a combination of in-line and broadside responses may differentiate thin reservoir-like resistive bodies from thicker subsurface resistivity. Also, since different inductive modes may be measured in the two cases, it is believed that measurement of both may aid the determination of anisotropy, which is essential in the imaging of EM data.

Figure 4:
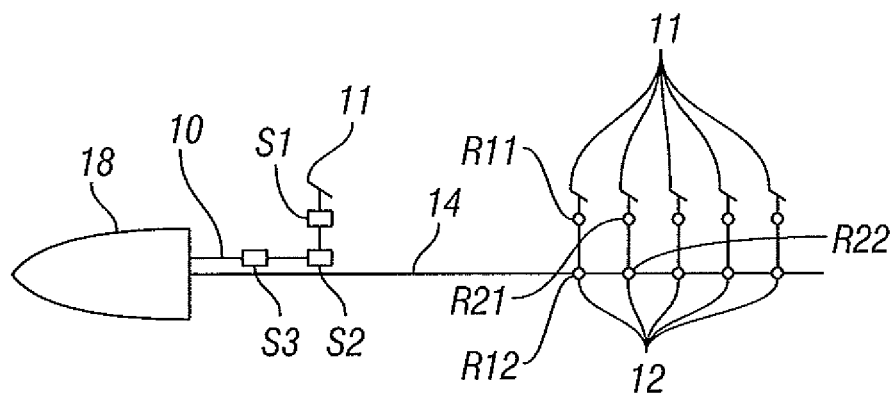
FIG. 4 illustrates another possible towing configuration showing single cable with in-line and broadside capabilities. The off-line source electrode and and/or off-line receiver electrodes may be connected by a line for stability.

The example marine electromagnetic survey system illustrated in FIG. 4 provides both in-line and broadside configurations. Source electrodes S2, S3 form an in-line source, while source electrodes S1, S2 form a broadside source. As illustrated, a single source cable 10 carries both co-linear and broadside sources. Likewise, receiver electrodes R12, R22 form an in-line receiver, while receiver electrodes R11, R12 form a broadside receiver. A voltage measuring device would be associated with the pair of electrodes R12, R22, while a second voltage measuring device would be associated with the pair of electrodes R11, R12. In some embodiments, a single voltage measuring device may be switchably associated with all of the electrodes R11, R12, R21, and R22. It should be understood that, in each embodiment, the associated voltage measuring device will need to be functionally connected via a voltage measuring circuit to provide appropriate in-line and broadside voltage measurements for that particular source/receiver configuration. For example, separate electrical wires in the receiver cables 10 may be used to measure potential differences for the in-line configuration across electrodes R12, R22, and for the broadside configuration across electrodes R11, R12. As illustrated, a single receiver cable 14 may carry both co-linear and broadside receivers. However, the broadside configurations may be operationally difficult, creating drag and pulling the electrodes with time-varying forces depending on the sea state, thereby creating a potentially large source of noise. Other towing configurations and data resolution techniques for in-line and broadside measurements are discussed in commonly-owned U.S. patent application Ser. Nos. 12/798,935, 12/799,941, and U.S. Pat. No.7,834,632, which are herein incorporated by reference.

Figure 5:
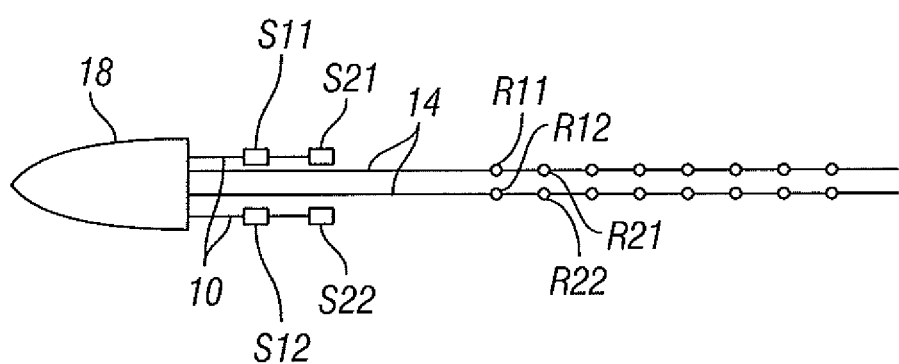
FIG. 5 illustrates another possible towing configuration showing a plan view of a ship towing two source cables and two receiver cables.

In some embodiments of the invention, as illustrated in FIG. 5, a survey vessel 18 may tow multiple source cables 10 and receiver cables 14. In particular, towing two substantially parallel (to the extent that lateral spacing can be reasonably controlled along the length of the cables) receiver cables 14 provides both in-line and broadside configurations without the use of broadside cables. For example, source electrodes S11, S21 and receiver electrodes R11, R21 provide a co-linear, in-line configuration. (As would be understood by one of ordinary skill in the art with the benefit of this disclosure, the distance between the source electrodes and the receiver electrodes is typically much greater than the distance between the source cable and the receiver cable, making source cable 14 effectively co-linear with receiver cable 10.) For in-line surveying, a current source (e.g. in recording system 20) energizes two source electrodes (e.g. S11 and S21) and the potential differences are measured between selected pairs of receiver electrodes (e.g. R11 and R21, R21 and R31, etc., to the end of the receiver line). One example of a broadside configuration in FIG. 5 is source electrodes S11, S12 and receiver electrodes R11, R12. (Alternatively, an example of a cross-line configuration is provided by source electrodes S11, S12 and receiver electrodes R11, R21.) It should be understood that the voltage measuring device associated with the pair of electrodes R11, R12 will utilize voltage measuring circuit making an electrical connection between the two receiver cables 14. In some embodiments, this electrical connection may be proximate and/or on board the survey vessel 18 so that nothing is towed broadside. For broadside measurements, a current source (e.g. in recording system 20) energizes two source electrodes (e.g. S11 and S 12) and potential differences are measured between selected pairs of receiver electrodes (e.g., R11 and R12, R21 and R22, etc., to the end of the receiver line.

As illustrated in FIG. 5, the source cables 10 and receiver cables 14 may be located at substantially the same depth in the body of water 22. Similarly, the electrode-containing portion of source cable 10 and/or receiver cable 14 may be substantially parallel to the surface of the body of water 22. However, in other embodiments, source cables 10 may be at different depths as receiver cables 14; each source cable 10 may be at a different depth from one another; each receiver cable 14 may be at a different depth from one another; the electrode-containing portion of one or more source cable 10 may vary in depth; and the electrode-containing portion of one or more receiver cable 14 may vary in depth. Depth control devices as commonly used with marine electromagnetic surveying could be utilized to establish any such configuration of source cables 10 and receiver cables 14. As would be understood by one of ordinary skill in the art with the benefit of this disclosure, selecting configurations with depth variation in the cables could provide additional components of electromagnetic response data.

Operationally, the survey vessel 18 may make one pass over the target formation to collect in-line data, and then the survey vessel may make a second pass collecting broadside data (or vice versa). The two passes may occur in quick succession, since the source cables 10 and receiver cables 14 will not require re-deployment or re-configuration to support the two different types of data. Collecting the data in two passes may result in higher quality and confidence in terms of anisotropy and inversion data.

According to some embodiments of the invention, both in-line and broadside configurations may be towed and operated simultaneously, which may greatly increase operational efficiency. For example, in-line source electrodes S11, S21 and broadside source electrodes S11, S12 could be run simultaneously with pseudo random binary sequence ("PRBS") switched currents, creating orthogonal time-varying EM fields.

According to another embodiment of the invention, source electrodes 511, S22 could be energized, creating a source direction at any angle to the line of towing, including for example 45°. In-line receiver electrodes R11, R21 and broadside receiver electrodes R11, R12 may provide measurements of the EM responses for two orthogonal directions from which the in-line and broadside responses may be determined, making this an operationally efficient configuration.

According to another embodiment of the invention, source electrodes S11, S21 may be energized creating a source direction 90° to the line of towing; in-line receiver electrodes R11, R22 may be used to determine a cross-line response. Alternatively, source electrodes S11, S22 may be energized creating a source direction 0° to the line of towing; receiver electrodes R11, R21 may be used to determine a cross-line response.

Determining both in-line and broadside responses may lead to inversions with a much greater degree of confidence for thin resistive layers, and with background anisotropies determined from surface measurements. Additionally, the source electrodes can be separated by as much as the maximum width of tow possible (i.e. many hundreds of meters), providing for a large source dipole. In some embodiments with in-line configurations, use of a short offset (distance between source and receiver) may facilitate noise reduction and removal techniques, as discussed in commonly owned U.S. Patent Application Nos. 2010/0017133 and 2010/0109671, which are herein incorporated by reference. In some embodiments with broadside configurations, use of a short offset in both towed receiver cables may facilitate estimation of noise in each receiver cable. It should be understood that noise in the broadside measurements will include the usual motional and magnetotelluric noise together with induction in what is effectively a loop between the first receiver cable, the cable connection through and from the vessel, the second receiver cable, and with the circuit completed by connection through the water. Induction in this loop can be calculated from first principles and can hence be estimated.

While the previous examples have illustrated embodiments with towed receiver cables, the scope of the invention contemplates receiver cables deployed at or near the bottom of the body of water and/or receiver nodes. For example, two parallel receiver cables could be fixed at or near the bottom of the body of water. At least one electrical connection would exist between the two receiver cables to complete the appropriate voltage measuring circuits. Likewise, rows of receiver nodes could be set out in parallel at or near the bottom of the body of water, and at least one electrical connection would exist between nodes for which voltage measurements are desired. A source-towing vessel could make either a single pass, or two orthogonal passes over the receiver cables or rows of receiver nodes to collect both in-line and broadside data.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee.

What is claimed is:

1. A method of electromagnetic geophysical surveying comprising:
    disposing a first and a second source electrode in a body of water, forming a first electromagnetic source, wherein the first source electrode is located on a first source cable and the second source electrode is located on a different second source cable;
    disposing a third source electrode in the body of water, wherein the third source electrode is located on the first source cable, and the first and third source electrodes form a second electromagnetic source;
    disposing a first and a second receiver electrode in the body of water;
    actuating the first electromagnetic source to impart a first electromagnetic field to a formation below the body of water, the actuating the first electromagnetic source comprises imparting a first time-varying current to the first and second source electrodes;
    actuating the second electromagnetic source to impart a second electromagnetic field to the formation below the body of water, the actuating the second electromagnetic source comprises imparting a second time-varying current to the first and third source electrodes;
    the first and second time-varying currents differ in at least one of: amplitude, frequency, phase, switching sequence, or any combination thereof;
    detecting a responsive electromagnetic field by measuring a potential difference between the first and the second receiver electrodes, wherein:
        the first and the second source electrodes define a first source dipole axis;
        the first and the second receiver electrodes define a first receiver dipole axis; and
        the first source dipole axis is not substantially parallel to the first receiver dipole axis.

2. The method of claim 1 wherein the first source dipole axis is substantially perpendicular to the first receiver dipole axis.

3. The method of claim 1 wherein the first source dipole axis makes a 45° angle with the first receiver dipole axis.

4. The method of claim 1 further comprising:
    towing the first electromagnetic source with a survey vessel along a first pass path while actuating the first electromagnetic source; and
    towing the first electromagnetic source with the survey vessel along a second pass path while actuating the first electromagnetic source, wherein the first pass path and the second pass path are substantially perpendicular.

5. A marine electromagnetic survey system comprising:
    a first source electrode located on a first source cable;
    a second source electrode located on a different second source cable, wherein the first and second source electrodes form a first electromagnetic source and define a first source dipole axis;
    a first receiver electrode located on a first receiver cable;
    a second receiver electrode located on a different second receiver cable, wherein the first and second receiver electrodes define a first receiver dipole axis which is not substantially parallel to the first source dipole axis;
    a survey vessel which is connected to the first and second source cables and the first and second receiver cables; and
    a voltage measuring circuit comprising:
        the first receiver electrode;
        the second receiver electrode;
        a voltage measuring device functionally connected between the first receiver electrode and the second receiver electrode; and
        an electrical connection proximate the survey vessel.

6. A method of electromagnetic geophysical surveying comprising:
    towing a first and a second source electrode in a body of water, the first and second source electrode forming a first electromagnetic source that defines a first source dipole axis, and the first and second source electrode disposed along a first source cable;
    towing a third source electrode in the body of water, the first and third source electrode forming a second electromagnetic source that defines a second source dipole axis;

towing a first and a second receiver electrode in the body of water, the first and second receiver electrode disposed along a first receiver cable, and the first and second receiver electrodes define a first receiver dipole axis parallel to the first source dipole axis;

towing a third receiver electrode in the body of water, the first and third receiver electrodes define a second receiver dipole axis perpendicular to the first receiver dipole axis;

actuating the first electromagnetic source to impart a first electromagnetic field to a formation below the body of water;

actuating the second electromagnetic source to impart a second electromagnetic field to the formation below the body of water;

detecting a first responsive electromagnetic field by measuring a potential difference between the first and the second receiver electrodes; and detecting a second responsive electromagnetic field by measuring a potential difference between the first and the third receiver electrodes.

7. The method of claim 6 wherein towing the third source electrode further comprises towing a second source cable, the third source electrode disposed along the second source cable, and the second source cable distinct from the first source cable.

8. The method of claim 6 wherein towing the third source electrode further comprises towing the first source cable with the third source electrode coupled to the first source cable.

9. The method of claim 6 wherein towing the third receiver electrode further comprises towing a second receiver cable, the third receiver electrode disposed along the second receiver cable, and the second receiver cable distinct from the first receiver cable.

10. The method of claim 6 wherein towing the third receiver electrode further comprises towing the first receiver cable with the third receiver electrode coupled to the first receiver cable.

11. The method of claim 6 wherein the second source dipole axis makes a 45° angle with the first receiver dipole axis.

12. The method of claim 9 wherein detecting the second responsive electromagnetic field further comprises measuring the potential difference by way of a voltage measuring circuit electrically connected to the first and third receiver electrodes.

13. A method comprising:
performing an electromagnetic geophysical survey by:

towing a first and a second source electrode in a body of water, the first and second source electrode forming a first electromagnetic source that defines a first source dipole axis, and the first and second source electrode disposed along a first source cable;

towing a third and a fourth source electrode in the body of water, the first and third source electrode forming a second electromagnetic source that defines a second source dipole axis perpendicular to the first source dipole axis, and the third and fourth source electrode disposed along a second source cable distinct from the first source cable;

towing a first and a second receiver electrode in the body of water, the first and second receiver electrode disposed along a first receiver cable, and the first and second receiver electrodes define a first receiver dipole axis parallel to the first source dipole axis;

towing a third and a fourth receiver electrode in the body of water, the third and fourth receiver electrode disposed along a second receiver cable distinct from the first receiver cable, the third and fourth receiver electrodes define a second receiver dipole axis parallel to the first source dipole axis, and the first and third receiver electrodes define a third receiver dipole axis perpendicular to the first source dipole axis;

actuating the first electromagnetic source to impart a first electromagnetic field to a formation below the body of water;

actuating the second electromagnetic source to impart a second electromagnetic field to the formation below the body of water;

measuring a potential difference between the first and the second receiver electrodes; and measuring a potential difference between the first and the third receiver electrodes.

14. The method of claim 13 wherein actuating the first electromagnetic source and actuating the second electromagnetic source further comprises simultaneously actuating the first and second electromagnetic sources.

15. The method of claim 14 wherein actuating the first electromagnetic source and actuating the second electromagnetic source further comprises:

actuating the first electromagnetic source in a first pass over the target formation while refraining from actuating the second electromagnetic source; and then actuating the second electromagnetic source in a second pass over the target formation while refraining from actuating the first electromagnetic source.

* * * * *